United States Patent [19]
Edwards

[11] Patent Number: 4,841,016

[45] Date of Patent: Jun. 20, 1989

[54] POLYESTER RESIN COMPOSITIONS

[76] Inventor: Bill R. Edwards, 1733 N. Parkdale, Wichita, Kans. 67212

[21] Appl. No.: 168,895

[22] Filed: Mar. 16, 1988

[51] Int. Cl.$^4$ ............................................. C08G 63/02
[52] U.S. Cl. ................................... 528/272; 528/274; 528/288; 528/290; 528/293; 528/354; 528/362; 528/363; 528/364; 524/92; 524/93; 524/186; 524/190; 524/234; 524/235; 524/237; 523/503; 523/507
[58] Field of Search ............... 528/272, 274, 288, 293, 528/290, 354, 362, 363, 364; 523/503, 507; 524/92, 93, 186, 190, 234, 235, 237

[56] References Cited

U.S. PATENT DOCUMENTS 3,288,735  11/1966  Watanabe et al. .................. 260/17.4
4,032,596   6/1977  Uffner et al. ......................... 260/862

OTHER PUBLICATIONS

Richter et al., "Azo Compounds for Free Radical Crosslinking of Polysiloxane Stationary Phases" CA100(8):52876t.
Minami et al., "Azo-Type Curing Agents for Unsaturated Polyesters" CA79(2):6186t.
MacLeay "Mixtures of Azoalkanes", CA105(24):209561q.

*Primary Examiner*—John Kight
*Assistant Examiner*—S. A. Acquah
*Attorney, Agent, or Firm*—Bill D. McCarthy

[57] ABSTRACT

An additive composition for enhancing curing and color clarity properties of polyester resins. The additive comprises from about 50 to 75 parts by weight of a mercaptan, and from about 50 to about 25 parts by weight of a quaternary ammonium salt. From about 0.5 to about 25 parts by weight of a polymerization initiator can be incorporated into the additive when the polyester resin is utilized as a gel coat. Resinous compositions formulated with the additive consist essentially of from about 50 to about 99.5 parts by weight of a polyester resin, from about 0.5 to about 35 parts by weight of the mercaptan, from about 0.1 to about 15 parts by weight of the quaternary ammonium salt, and a minor effective amount of an oxidizing agent for the polyester resin.

12 Claims, No Drawings

POLYESTER RESIN COMPOSITIONS

BACKGROUND OF THE INVENTION

1. Field of the Invention

The present invention relates to polymeric compositions, and more particularly but not by way of limitation, to polyester resin compositions having improved curing and color clarity properties. In one aspect the present invention relates to an additive composition for improving the curing rate and color clarity properties of polyester resins.

2. Brief Description of the Prior Art

Polyester resin compositions have heretofore been used in the fabrication of articles such as counter tops and sink bowls, as well as a gel coating for articles such as boat hulls. Generally, the polyester resin compositions contain metal or amine constituents in order to effect the curing of the compositions. Problems have been encountered, however, with the curing rate of such metal and amine-containing polyester resins, as well as the color uniformity of the articles fabricated from such polyester resins. In some instances heat must be applied to the article to obtain an effective cure of the polyester resin. Further, when using such polyester resins in a spraying operation for the gel coating of an article, the evaporation of the amine constituent may create a health hazard.

Because of the versatility of polyester resins in the fabrication of articles it would be highly desirable if an additive could be formulated for polyester resins which did not require the incorporation of amine and metal constituents in the resin; and wherein the resulting polyester composition possessed improved curing and color clarity properties. It is to such an additive and polyester resin composition that the subject invention is directed.

SUMMARY OF THE INVENTION

An improved additive composition is provided for enhancing the curing and color clarity properties of polyester resins without the use of amine and metal constituent initiators when employing the additive composition of the present invention the curing of such polyester resins can be achieved at ambient temperatures. The additive comprises from about 50 to about 75 parts by weight of a mercaptan and from about 50 to about 25 parts by weight of a quaternary ammonium salt. When employing the additive with a polyester resin which is to be applied to an article as a gel coat, the additive further comprises from about 0.5 to about 25 parts by weight of a polymerization initiator.

The resinous compositions of the present invention formulated with the additive consist essentially of from about 50 to about 99.5 parts by weight of a polyester resin, from about 0.5 to about 35 parts by weight of the mercaptan, from about 0.1 to about 15 parts by weight of the quaternary ammonium salt, and a minor effective amount of an oxidizing agent to initiate a cross linking reaction to achieve curing of the polyester resin constituent of the resinous composition.

An object of the present invention is to provide an additive composition for improving the curing properties of polyester resins.

Another object of the present invention, while achieving the before-stated object, is to provide a polyester resinous composition substantially free of amine and metal constituents suitable for use in the fabrication of articles.

Another object of the present invention, while achieving the before-stated objects, is to provide a polyester resinous composition having improved curing properties.

Another object of the present invention, while achieving the before-stated objects, is to provide a polyester resinous composition having improved color clarity properties without sacrificing the curing properties of the polyester resinous composition.

Yet another object of the present invention, while achieving the before-stated objects, is to provide a polyester resinous composition which can be cured at ambient temperatures.

Other objects, advantages and features of the present invention will become apparent upon reading of the following detailed description in conjunction with the appended claims.

DETAILED DESCRIPTION

The present invention provides an additive composition for polyester resinous compositions which permits the polyester resinous compositions to be cured at ambient temperatures. The polyester resin employed in the practice of the present invention is substantially free of amine and metal constituents. The additive composition comprises from about 50 to about 75 parts by weight of a mercaptan and from about 50 to about 25 parts by weight of a quaternary ammonium salt.

The polyester resinous composition resulting from the incorporation of the additive composition thus consists essentially of from about 50 to about 99.5 parts by weight of the polyester resin, from about 0.5 to about 35 parts by weight of a mercaptan, from about 0.1 to about 15 parts by weight of a quarternary ammonium salt, (the components forming the additive) and a minor effective amount of an oxidizing agent to initiate and achieve the curing of the polyester resin. The minor effective amount of the oxidizing agent which is employed to effect the desired curing will vary depending upon the rate of curing desired, but desirable results are obtainable when the amount of the oxidizing agent incorporated into the polyester resinous composition is from about 0.3 to about 8 parts by weight, and more desirably from about 1 to about 3 parts by weight. When the polyester resin containing the additive is to be applied as a gel coat to an article, the additive further comprises from bout 3 to about 10 parts by weight of a polymerization initiator.

The polyester constituent of the resinous composition, which is in a liquid state, is commercially available and includes isophthalic polyester resin, orthophtalic polyester resin and terephthalic polyester resin. Such polyester resins are well known in the art. Thus, no further description or comments concerning the polyester constituent are believed necessary in order to permit one to understand and effectively practice the present invention, with the exception that such polyester resins are substantially free of amine and metal constituents.

The mercaptan constituent of the additive employed in the formulation of the polyester resinous compositions of the subject inventionis represented by the general formula RSH werein R contains from 1 to about 22 carbon atoms. Further, R can be any suitable moiety, such as alkyl moiety, a cycloaliphatic moiety and the like. Illustrative of such mercaptans are methyl mercaptan, propyl mercaptan, dilimonen dimercaptan, cyclohexyl dimercaptan, ethylcyclohexyl dimercaptan and mixed primary tridecyl mercaptan.

It should be noted that the only requirements for the mercaptan constituent are that the mercaptan be in liquid form under the conditions of mixing, and that the mercaptan be compatible with the polyester resin, the quaternary ammonium salt and the oxidizing agent used in the polyester resinous composition.

The quaternary ammonium salt, another constituent of the additive, employed in the formulation of the polyester resinous compositions having improved curing and color clarity properties, can be any suitable quaternary ammonium salt generally known in the industry as a "fabric softener." Illustrative examples of such quaternary ammonium salts are as follows:

Dialkyldimethylammonium chlorides, such as dicocodimethylammonium chloride and ditallowdimethylammonium chloride;

Dialkyldimethylammonium methylsulfates;

Alkyltrimethylammonium chlorides, such as soya trimethylammonium chloride, hydrogenated tallow trimethylammonium chloride, palmityltrimethylammonium chloride, cocotrimethylammonium chloride, tallow trimethylammonium chloride, and benzyltrimethylammonium chloride;

Alkyldimethylbenzylammonium chlorides, such as dimethylalklyl ($C_{14}$-$C_{18}$) benzylammonium chloride and dimethylalkyl ($C_{12}$-$C_{16}$) benzylammonium chloride.

It should be noted that the above examples are merely illustrative of the quaternary ammonium salts which can be used in the formulation of the additive for polyester resinous compositions having improved curing and color clarity properties. Further, of such quaternary ammonium salts it is believed that the most desirable of such salts for use in the formulation of the additive of the present invention are dicocodimethylammonium chloride, benzyltrimethylammonium chloride, trimethyldodecylammonium chloride dimethylalkyl ($C_{12}$-$C_{16}$) benzylammonium chloride and dimethylstearylbenzylammonium chloride.

The additive comprising the mercaptan and the quaternary ammonium salt can be premixed for incorporation into the polyester resin, or each of the constituents can be added sequentially to the polyester resin prior to the incorporation of the oxidizing agent. However, regardless of which procedure is used to incorporate the additive into the polyester resin sufficient mixing should be achieved to insure that the additive is uniformly dispersed throughout the polyester resin.

To effect the desired curing of the polyester resin constituent of the compositions of the present invention a minor effective amount of the oxidizing agent is incorporated into the composition, the minor effective amount being that amount required to donate sufficient oxygen to initiate the curing reaction of the polyester resin. The amount of the oxidizing agent employed can vary widely depending upon the rate of curing desired. However, desirable results have been obtained wherein the amount of oxidizing agent incorporated into the composition is from about 0.3 to about 8 parts by weight, based on the total weight of the composition.

Any oxidizing agent which is compatible with the other constituents of the formulation, and which is capable of donating the required amount of oxygen to initiate the curing reaction of the polyester resin can be employed in the practice of the subject invention. Illustrative of such curing agents are hydrogen peroxide, perchlorate, nitric acid, potassium permanganate, cuprous chloride and ferric chloride. However, especially desirable results have been obtained wherein the oxidizing agent is hydrogen peroxide.

When employing the polyester resin compositions of the subject invention to apply a gel coating to an article, such as a boat hull, it is necessary that the composition be applied as a relatively thin coating. In such instances the composition will desirably contain from about 3 to about 10 parts by weight of a polymerization initiator so that the resin composition can be effectively applied as a gel coating to an article, and at the same time the curing properties of the composition can be enhanced without adversely effecting color clarity of the resinous composition. Any polymerization initiator which contains no oxygen and causes little or no cross linking of the polyester resin can be employed. However, desirable results have been obtained wherein the polymerization initiator is a mixture of the following compounds:

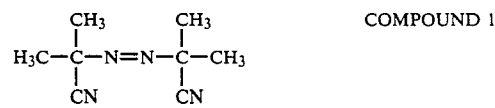
COMPOUND 1

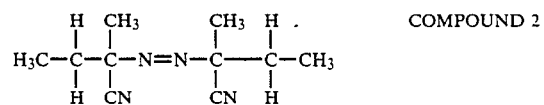
COMPOUND 2

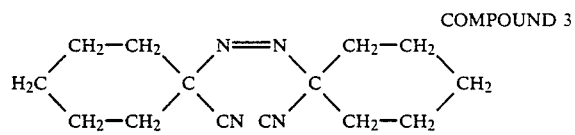
COMPOUND 3

The amount of each of the above-identified compounds used in the formulation of the polymerization initiator can vary, but generally the polymerization initiator comprises from about 0.1 to 25 parts by weight of Compound 1, from about 0.5 to 25 parts by weight of Compound 2, and from about 0.5 to 25 parts by weight of Compound 3. While the amount of each of the compounds 1 through 3 utilized in the formulation of the polymerization initiator can vary within the amounts set forth, desirable results can be obtained when such are incorporated in substantially equal parts in the formulation of the polymerization initiator. Each of the above-described compounds used in the formulation of the polymerization initiator are in a solid state, and are soluble in functional or aromatic hydrocarbon solvent. Thus, it is desirable to solubilize the compounds by the addition of an effective amount of a functional or aromatic hydrocarbon solvent for enhancing dispersement of the resulting polymerization initiator into either the additive or the resinous composition.

Any suitable solvent can be employed which does not adversely effect the curing or color clarity properties of the resinous composition, such as propylene glycol, ethylene glycol, butyl lactone, tynol, and butylacetone. Further, the amount of solvent employed to solubilize the polymerization initiator can vary widely, depending upon the solvating properties of the solvent and the amount of polymerization initiator incorporated into the composition. For example, desirable results can be obtained wherein the solvent employed to solubilize the compounds constituting the initiator is butyl lactone;

and the amount of the butyl lactone employed is from about 0.10 to about 25 parts by weight.

In preparing the resinous compositions of the present invention the polyester resin is weighed to determine the amounts of the mercaptan, the quaternary ammonium salt and the oxidizing agent required to obtain a composition having the desired curing and color clarity properties. Thereafter, the mercaptan and the quaternary ammonium salt can be admixed into the polyester resin in the desired amounts of form a resulting mixture. When the composition is ready for use the oxidizing agent is incorporated into the mixture of the polyester resin and the additive consisting of the mercaptan and the quaternary ammonium salt. If one desires to incorporate the polymerization initiator as set forth above into the composition, the polymerization initiator is added to the polyester-additive mixture prior to the addition of the oxidizing agent.

In order to further illustrate the present invention the following examples are given. However, it is to be understood that the examples are for illustrative purposes only and are not to be construed as limiting the scope of the subject invention.

EXAMPLE I

An additive is prepared by mixing two parts by weight of a mercaptan (which is manufactured by Henkle Corporation of Chicago, Illinois and marketed as a mixed mercaptan under the trade name "Capture 3-800), and one part by weight of benzyltrimethylammonium chloride. The two constituents are thoroughly admixed to form a uniform solution. Thereafter, a predetermined amount of a substantially amine and metal free polyester resin is added to a container (1 pound of 40-805 polyester resin manufactured by Freeman). 0.3 parts by weight (i.e. approximately 13 drops) of the additive is then introduced into the container and the resulting mixture is thoroughly mixed to insure substantially uniform dispersement of the additive throughout the polyester resin. 0.3 parts by weight (i.e. 13 drops) of hydrogen peroxide (oxidizing agent) is then admixed with the polyester-additive mixture and the curing rate of the resulting composition determined, as well as the color clarity of the resulting product.

An effective cure of the resinous composition is obtained at ambient temperature in 2 hours and the product exhibits improved color clarity when compared to compositions prepared with polyester resins containing amine and metal constituents. Further, the curing rate of the resulting resinous composition can be varied by controlling the amount of the hydrogen peroxide (oxidizing agent) incorporated into the resinous mixture.

EXAMPLE II

A polymerization initiator is formulated utilizing equal parts by weight of the following compounds:

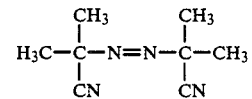

COMPOUND 1

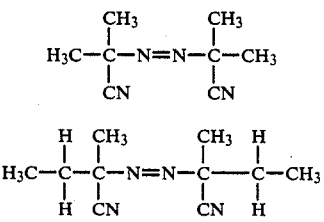

COMPOUND 2

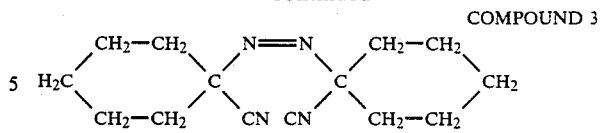

COMPOUND 3

The compounds 1-3 above, which are in particulate form, are mixed thoroughly and thereafter 1 part by weight of butyl lactone is added to 1 part by weight of the dry mixture to solubilize the compounds.

The procedure of Example I is repeated except that 2 parts by weight of the solubilized polymerization initiator is incorporated into the resinous mixture prior to addition of the oxidizing agent. The composition is applied to a substrate as a gel coat having an average thickness of about 40 mils. The finished product exhibits excellent cure rate properties at ambient temperature as well as improved color clarity.

It will be clear that the present invention is well adapted to carry out the objects and attain the advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims.

What is claimed is:

1. An additive composition for enhancing the curing and color clarity properties of a polyester resin at ambient temperatures in the presence of an oxidizing agent wherein the polyester resin is substantially free of amines and metal constituents, the additive composition comprising:

from about 50 to about 75 parts by weight of a mercaptan; and from about 50 to about 25 parts by weight of a quarternary ammonium salt.

2. The additive composition of claim 1 further comprising:

from about 0.5 to about 25 parts by weight of a polymerization initiator consisting essentially of from about 0.1 to about 25 parts by weight of a compound represented by the formula

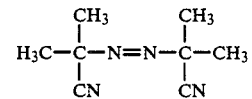

from about 0.5 to about 25 parts by weight of a compound represented by the formula

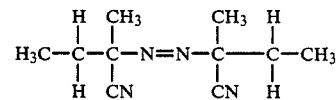

and from about 0.5 to about 25 parts by weight of a compound represented by the formula

3. The additive composition of claim 2 wherein the compounds forming the polymerization initiator are in particulate form and wherein the polymerization initiator further comprises an effective amount of a solvent selected from the group consisting of a functional solvent and an aromatic hydrocarbon solvent to solubilize the compounds.

4. The additive composition of claim 3 wherein the solvent is butyl lactone and the effective amount of the butyl lactone admixed with the compounds to solubilize same is from about 0.1 to about 25 parts by weight.

5. The additive composition of claim 1 wherein the mercaptan is represented by the general formula RSH wherein R contains from 1 to about 22 carbon atoms.

6. The additive composition of claim 5 wherein the mercaptan is selected from a group consisting of methyl mercaptan, propyl mercaptan, dilimonen dimercaptan, cyclohexyl dimercaptan, ethylcyclohexyl dimercaptan and mixed primary tridecyl mercaptan.

7. The additive composition of claim 6 wherein the quaternary ammonium salt is selected from the group consisting of dicocodimethylammonium chloride, benzyltrimethylammonium chloride, trimethyldodecylammonium chloride, dimethylalkyl ($C_{12}$–$C_{16}$) benzylammonium chloride and dimethylstearylbenzylammonium chloride.

8. A polyester resin composition curable at ambient temperatures, the polyester resin composition consisting essentially of:
   from about 50 about 99.5 parts by weight of a polyester resin wherein the polyester resin is substantially free of amines and metal constituents;
   from about 0.5 to about 35 parts by weight of a mercaptan having the general formula RSH wherein R is an alkyl moiety containing from 1 to about 22 carbon atoms;
   from about 0.1 to about 15 parts by weight of a quaternary ammonium salt; and
   from about 0.3 to about 8 parts by weight of an oxidizing agent for the polyester resin.

9. The polyester resin composition of claim 8 wherein the mercaptan is selected from the group consisting of methyl mercaptan, propyl mercaptan, dilimonen dimercaptan, cyclohexyl dimercaptan, ethyl cyclohexyl dimercaptan and mixed primary tridecyl mercaptan.

10. The polyester resin composition of claim 9 wherein the quaternary ammonium salt is selected from a group consisting of dicocodimethylammonium chloride, benzyltrimethylammonium chloride, trimethyldodecylammonium chloride, dimethylalkyl ($C_{12}$–$C_{16}$) benzylammonium chloride and dimethylstearylbenzylammonium chloride.

11. The polyester resin composition of claim 10 which further includes from about 0.1 to about 25 parts by weight of a polymerization initiator, the polymerization initiator consisting essentially of:
   from about 0.1 to about 25 parts by weight of a compound represented by the formula

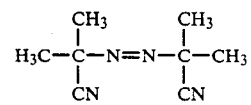

from about 0.5 to about 25 parts by weight of a compound represented by the formula

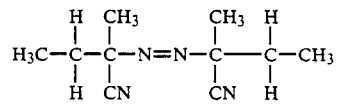

and
   from about 0.5 to about 25 parts by weight of a compound represented by the formula

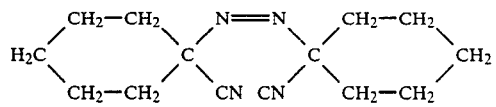

12. The polyester resin composition of claim 11 wherein from about 0.1 to about 25 parts by weight of butyl lactone is admixed with the compounds forming the polymerization initiator to effectively solubilize the compounds and enhance dispersement of same in the polyester resin.

* * * * *

UNITED STATES PATENT AND TRADEMARK OFFICE
CERTIFICATE OF CORRECTION

PATENT NO. : 4,841,016

DATED : June 20, 1989

INVENTOR(S) : Bill R. Edwards

It is certified that error appears in the above-identified patent and that said Letters Patent is hereby corrected as shown below:

In column 1, line 43, "initiators when" should read --initiator. When--. In column 2, line 36 "quarternary" should read --quaternary--. In column 2, line 53 "isophthalic" should read --isophtalic--. In column 2, line 63, "inventionis" should read --invention is--. column 5, line 53, "dizing) agent)" should read --dizing agent)--. In column 6, lines 42, 43, "quarternary" should read --quaternary--.

Signed and Sealed this

Fourth Day of September, 1990

Attest:

HARRY F. MANBECK, JR.

*Attesting Officer*     *Commissioner of Patents and Trademarks*